(12) United States Patent
Luo et al.

(10) Patent No.: US 11,651,548 B2
(45) Date of Patent: May 16, 2023

(54) METHOD AND APPARATUS FOR COMPUTER MODEL RASTERIZATION

(71) Applicant: HUAWEI TECHNOLOGIES CO., LTD., Guangdong (CN)

(72) Inventors: Yan Luo, Markham (CA); Botao Xiao, Markham (CA)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/370,782

(22) Filed: Jul. 8, 2021

(65) Prior Publication Data
US 2023/0011882 A1   Jan. 12, 2023

(51) Int. Cl.
*G06T 15/83* (2011.01)
*G06T 15/00* (2011.01)
*G06T 15/50* (2011.01)

(52) U.S. Cl.
CPC ............ *G06T 15/83* (2013.01); *G06T 15/005* (2013.01); *G06T 15/503* (2013.01)

(58) Field of Classification Search
CPC ...... G06T 15/83; G06T 15/005; G06T 15/503
See application file for complete search history.

(56) References Cited

U.S. PATENT DOCUMENTS

| | | | |
|---|---|---|---|
| 5,367,617 A * | 11/1994 | Goossen | G06F 17/17 345/442 |
| 7,567,252 B2 | 7/2009 | Buck et al. | |
| 7,593,021 B1 | 9/2009 | Tynefield, Jr. et al. | |
| 7,986,325 B1 * | 7/2011 | Gold | G06T 15/04 345/506 |
| 2008/0266287 A1 * | 10/2008 | Ramey | G06T 15/005 345/419 |
| 2009/0051687 A1 | 2/2009 | Kato et al. | |
| 2014/0354669 A1 | 12/2014 | Galazin et al. | |
| 2017/0329928 A1 | 11/2017 | Song et al. | |

OTHER PUBLICATIONS

Wang, Rui, et al. "Automatic shader simplification using surface signal approximation." ACM Transactions on Graphics (TOG) 33.6 (2014): 1-11. (Year: 2014).*
T. Ikeda; F. Ino; K. Hagihara "A code motion technique for accelerating general-purpose computation on the GPU", Apr. 2006, 20th IEEE International Parallel and Distributed Symposium.

* cited by examiner

*Primary Examiner* — Daniel F Hajnik
(74) *Attorney, Agent, or Firm* — Locke Lord LLP; Tim Tingkang Xia, Esq.

(57) ABSTRACT

There is described a method of rasterizing a computer model. One or more non-linear expressions of code are identified in a fragment shader. The one or more non-linear expressions of code are transformed into one or more linear expressions of code. The one or more linear expressions of code are transferred from the fragment shader to a vertex shader. The computer model is then rasterized by executing, on the computer model, code comprised in the vertex shader, including the transferred one or more linear expressions of code.

22 Claims, 11 Drawing Sheets

METHOD AND APPARATUS FOR COMPUTER MODEL RASTERIZATION

RELATED APPLICATIONS

This is the first patent application pertaining to the disclosed technology.

FIELD

The present disclosure relates to methods, apparatus, computer-readable media, and computing devices for performing rasterization of a computer model.

BACKGROUND

In computer graphics processing, a computer model may be thought of basically as a collection of data that serves as a representation of an image or part of an image. For the purposes of discussion, a computer model is converted by one or more graphics processing units (GPUs), through a process known as rasterization, into an image suitable for display. Typically, computer models are defined according to many interconnected polygons, such as triangles or quadrilaterals. The corners of these polygons are known as vertices, and each polygon contains a number of pixels whose positions are defined according to the relative positions of the vertices.

During the rasterization process, the computer model is first processed by a vertex shader of the GPU which processes the vertices of each polygon. For example, the vertex shader may determine a colour that is to be associated with each vertex of the polygon. The output of the vertex shader is then passed to a rasterizer which identifies each pixel comprised within the polygon. For each pixel, the rasterizer interpolates a colour to be associated with the pixel based on the position of the pixel relative to the vertices and based on the colours of the vertices. The output of the rasterizer is then passed to a fragment shader of the GPU, whereat each pixel is then further processed according to the particular functions defined in the fragment shader. This overall process occurs in what is referred to as a rasterization pipeline.

For any given polygon, there are many more pixels than there are vertices. As a result, when rasterizing a polygon, the fragment shader is generally called upon many more times than the vertex shader. This can result in processing bottlenecks, for example hotspots, at the fragment shader, reducing the speed at which the computer model is rasterized and, as a result, reducing the overall efficiency of the graphics processing.

SUMMARY

Generally, according to embodiments of the disclosure, there are described methods of rasterizing a computer model for displaying the computer model on a display, such as a computer screen. As described above, because the fragment shader is generally called upon many more times than the vertex shader, embodiments of the disclosure are aimed at transferring, to the vertex shader, operations normally carried out in the fragment shader. This may relieve some of the processing requirements placed on the fragment shader, by leveraging the processing capacity of the vertex shader.

In particular, according to embodiments of the disclosure, one or more non-linear expressions of code contained in the fragment shader are transformed into linear expression of code. For example, non-linear expressions of code may be approximated to corresponding linear expressions of code. For instance, according to some embodiments, a curve represented by a non-linear expression of code may be approximated to one or more straight lines that define the corresponding linear expression of code.

The approximated or converted linear expressions of code are then transferred, or hoisted, from the fragment shader to the vertex shader. Therefore, when rasterizing the computer model, the vertex shader processes the computer model by executing the transferred one or more linear expressions of code. As a result, rasterization of the computer may become more efficient since code that would otherwise have been executed by the generally over-burdened fragment shader is now executed by the vertex shader instead.

According to a first aspect of the disclosure, there is described a method of rasterizing a computer model, comprising: identifying in a fragment shader one or more non-linear expressions of code; transforming the one or more non-linear expressions of code into one or more linear expressions of code; transferring the one or more linear expressions of code from the fragment shader to a vertex shader; and rasterizing the computer model, comprising executing, on the computer model, code comprised in the vertex shader, including the transferred one or more linear expressions of code.

Therefore, non-linear expressions of code that may be computationally expensive may be transformed into linear expressions of code. The transformed linear expressions of code may then be transferred from the fragment shader to the vertex shader. This may reduce the processing requirements placed on the fragment shader, and may distribute more evenly the graphics processing requirements between the vertex shader and the fragment shader.

Rasterizing the computer model may comprise: extracting vertex input data from the computer model; generating vertex output data by executing code comprised in the vertex shader on the vertex input data; generating fragment input data by processing the vertex output data using a rasterizer; and generating fragment output data by executing code comprised in the fragment shader on the fragment input data.

Generating the fragment input data may comprise linearly interpolating the fragment input data based on the vertex output data.

Various forms of linear interpolation may be used, such as flat interpolation, smooth interpolation, and no perspective interpolation, as described in further detail below.

The vertex input data may comprise position data associated with vertices of one or more polygons of the computer model.

The vertex input data may comprise other data, such as user-defined attributes of the computer model, for example one or more surface characteristics, one or more motion vectors, and opacity.

The vertex output data may comprise colour data associated with vertices of one or more polygons of the computer model.

The vertex output data may comprise other data, such as such as user-defined attributes of the computer model, for example one or more surface characteristics, one or more motion vectors, and opacity.

The fragment input data may comprise position data and colour data associated with pixels comprised within one or more polygons defined by the vertex input data.

The fragment input data may comprise other data, such as such as user-defined attributes of the computer model, for example one or more surface characteristics, one or more motion vectors, and opacity.

Transforming the one or more non-linear expressions of code into the one or more linear expressions of code may comprise: approximating the one or more non-linear expressions of code to the one or more linear expressions of code.

Any suitable method of approximating the one or more non-linear expressions of code to the one or more linear expressions of code may be used. For example, any method that seeks to reduce the average error between a curve and a straight line may be used. In this context, average may refer to a mean value, a median value, a mode value, a weighted average, or any other value that is representative of a wider group of values.

Approximating the one or more non-linear expressions of code to the one or more linear expressions of code may comprise: determining a curve represented by at least one of the one or more non-linear expressions of code; approximating the curve to one or more straight lines; and determining the one or more linear expressions of code based on the one or more straight lines.

The method may further comprise: dividing the curve into multiple curve portions, wherein approximating the curve to the one or more straight lines comprises approximating the multiple curve portions to multiple straight lines, wherein each straight line approximates a respective one of the curve portions, and wherein determining the one or more linear expressions of code comprises determining the one or more linear expressions of code based on the multiple straight lines.

Approximating the one or more non-linear expressions of code to the one or more linear expressions of code may comprise: determining a curve represented by at least one of the one or more non-linear expressions of code; approximating the curve to a straight line; determining an average difference between the straight line and the curve; adjusting the straight line so as to minimize the difference between the straight line and the curve; and determining the one or more linear expressions of code based on the adjusted straight line.

In this context, average may refer to a mean value, a median value, a mode value, a weighted average, or any other value that is representative of a wider group of values.

The curve may be monotonic.

Approximating the one or more non-linear expressions of code to the one or more linear expressions of code may comprise: determining a curve represented by at least one of the one or more non-linear expressions of code; determining an average value of fragment input data that is processed by the fragment shader; determining a straight line based on a value of the curve at the average value of the fragment input data and based on an inflection point of the curve; and determining the one or more linear expressions of code based on the determined straight line.

The method may further comprise, prior to determining the average value of the fragment input data: determining a distribution of the fragment input data; and determining, based on the distribution of the fragment input data, that the fragment input data does not comprise any bias points.

Transforming the one or more non-linear expressions of code into the one or more linear expressions of code may comprise: determining a curve represented by at least one of the one or more non-linear expressions of code; determining a bias point within fragment input data that is processed by the fragment shader; determining, based on the bias point, a tangent to the curve; and determining, based on the tangent, the one or more linear expressions of code.

Determining the tangent may comprise determining the tangent to the curve at the bias point.

Determining the one or more linear expressions of code may comprise: determining a linear expression of the tangent; and determining the one or more linear expressions of code based on the linear expression of the tangent.

The curve may be differentiable at the bias point.

Determining the bias point may comprise determining the bias point based on one or more values towards which the fragment input data tends.

Input values may be biased if, for example, the input values are concentrated around one or more bias points as opposed to being relatively evenly distributed throughout the input value range.

Determining the bias point may comprise: determining whether profiling data is available; after determining whether the profiling data is available, determining a distribution of the fragment input data; and determining the bias point based on the distribution of the fragment input data.

Profiling data may be data that is generated by performing rasterization on the computer model prior to the application featuring the computer model being deployed "online" (e.g. being used by customers). For example, in the case of a computer game, the computer game may be played by one or more users during a profiling phase before the game is shipped to customers. During the profiling phase, profiling data may be generated by the graphics processing unit. Profiling data generally refers to raw data that can be interpreted to show performance-related characteristics of a running program.

Determining the distribution of the fragment input data may comprise determining the distribution of the fragment input data based on the profiling data.

Determining the distribution of the fragment input data may comprise: determining whether a vertex count of one or more polygons of the computer model is less than a threshold; and after determining whether the vertex count is less than the threshold, determining the bias point based on the distribution of the fragment input data.

For example, if the vertex count is determined to not be too high (i.e. not above the threshold), then determining the distribution of the fragment input data may be acceptable if performed "online" (e.g. when the program is being used in real time by a customer), without the need for access to profiling data that has been generated offline (e.g. when the program is not being used in real time by a customer).

The method may further comprise: identifying in the fragment shader one or more linear expressions of code not comprised in the one or more transformed linear expressions of code; and transferring, from the fragment shader to the vertex shader, the one or more linear expressions of code not comprised in the one or more transformed linear expressions of code.

Thus, in addition to converting non-linear code expressions into linear code expressions, and transferring the converted linear code expressions from the fragment shader to the vertex shader, code expressions in the fragment shader that are already linear may also be transferred from the fragment shader to the vertex shader. This may further reduce the processing requirements placed on fragment shader, and may further distribute more evenly the graphics processing requirements between the vertex shader and the fragment shader.

According to a further aspect of the disclosure, there is provided a computer-readable medium comprising computer program code stored thereon and configured, when executed by one or more processors, to cause the one or more processors to perform a method of rasterizing a computer model, comprising: identifying in a fragment shader one or more non-linear expressions of code; transforming the one or more non-linear expressions of code into one or more linear expressions of code; transferring the one or more linear expressions of code from the fragment shader to a vertex shader; and rasterizing the computer model, comprising executing, on the computer model, code comprised in the vertex shader, including the transferred one or more linear expressions of code.

The method may furthermore comprise performing any of the operations described above in connection with the first aspect of the disclosure.

According to a further aspect of the disclosure, there is provided a computing device comprising one or more graphics processors operable to perform rasterization of a computer model, wherein the rasterization comprises: identifying in a fragment shader one or more non-linear expressions of code; transforming the one or more non-linear expressions of code into one or more linear expressions of code; transferring the one or more linear expressions of code from the fragment shader to a vertex shader; and rasterizing the computer model, comprising executing, on the computer model, code comprised in the vertex shader, including the transferred one or more linear expressions of code.

The one or more graphics processors may be operable to perform any of the operations described above in connection with the first aspect of the disclosure.

This summary does not necessarily describe the entire scope of all aspects. Other aspects, features, and advantages will be apparent to those of ordinary skill in the art upon review of the following description of specific embodiments.

BRIEF DESCRIPTION OF THE DRAWINGS

Embodiments of the disclosure will now be described in detail in conjunction with the accompanying drawings of which.

DETAILED DESCRIPTION

The present disclosure seeks to provide novel methods, computer-readable storage media, and computing devices for performing rasterization of a computer model. While various embodiments of the disclosure are described below, the disclosure is not limited to these embodiments, and variations of these embodiments may well fall within the scope of the disclosure which is to be limited only by the appended claims.

Embodiments of the disclosure may generally be used in connection with computer graphics processing involving rasterization, for example as performed during mobile device and desktop computer gaming. Furthermore, embodiments of the disclosure may be applied to an electronic computing device, as will now be described in further detail in connection with FIG. 1. The following describes the computing device, a graphics processing unit of the computing device, and embodiments for using the graphics processing unit for rasterizing a computer model for display on a graphical user interface of the computing device.

In some embodiments, the computing device may be a portable computing device, such as a tablet computer or a laptop with one or more touch-sensitive surfaces (for example, one or more touch panels). It should be further understood that, in other embodiments of this disclosure, the computing device may alternatively be a desktop computer with one or more touch-sensitive surfaces (for example, one or more touch panels).

Figure 1:
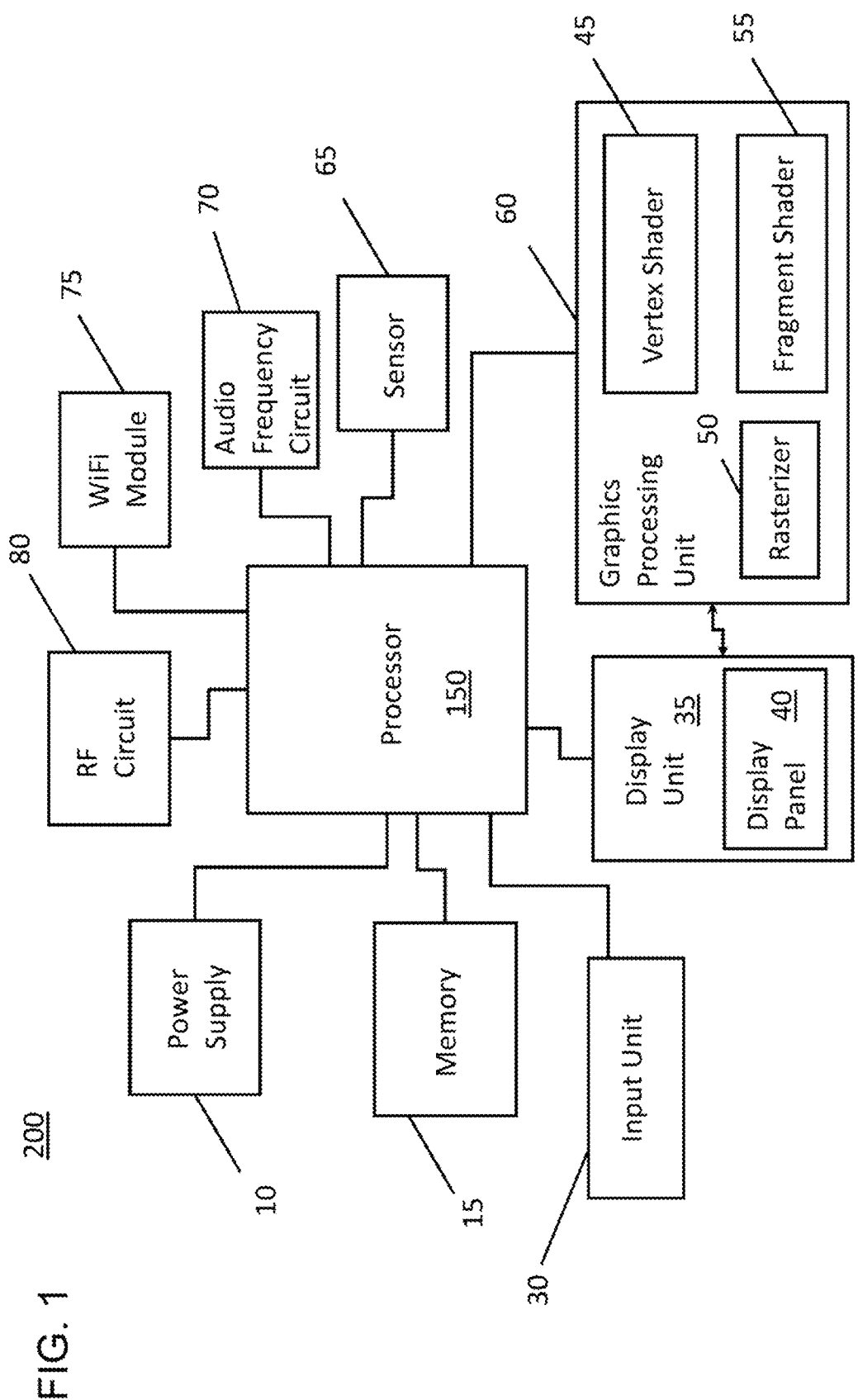
FIG. 1 is a schematic diagram of a computing device according to an embodiment of the disclosure.

For example, as shown in FIG. 1, the computing device according to embodiments of this disclosure may be a computing device 200. The following specifically describes an embodiment of using computing device 200 as an example. It should be understood that computing device 200 shown in the figure is merely an example of possible computing devices that may perform the methods described herein, and computing device 200 may have more or fewer components than those shown in the figure, or may combine two or more components, or may have different component configurations. Various components shown in the figure may be implemented in hardware, software, or a combination of hardware and software that include one or more signal processing and/or application-specific integrated circuits.

As shown in FIG. 1, computing device 200 may specifically include components such as one or more processors 150, a radio frequency (RF) circuit 80, a memory 15, display unit 35, one or more sensors 65 such as a fingerprint sensor, a wireless connection module 75 (which may be, for example, a Wi-Fi® module), an audio frequency circuit 70, an input unit 30, a power supply 10, and a graphics processing unit (GPU) 60. These components may communicate with each other by using one or more communications buses or signal cables (not shown in FIG. 1). A person skilled in the art may understand that a hardware structure shown in FIG. 1 does not constitute a limitation on computing device 200, and computing device 200 may include more or fewer components than those shown in the figure, may combine some components, or may have different component arrangements.

The following describes in detail the components of computing device 200 with reference to FIG. 1.

Processor 150 is a control center of the computing device 200. Processor 150 is connected to each part of computing device 200 by using various interfaces and lines, and performs various functions of computing device 200 and processes data by running or executing an application stored in memory 15, and invoking data and an instruction that are stored in memory 15. In some embodiments, processor 150 may include one or more processing units. An application processor and a modem processor may be integrated into processor 150. The application processor mainly processes an operating system, a user interface, an application, and the like, and the modem processor mainly processes wireless communication. It should be understood that the modem processor does not have to be integrated in processor 150. For example, processor 150 may be a Kirin chip 970 manufactured by Huawei Technologies Co., Ltd. In some other embodiments of this disclosure, processor 150 may further include a fingerprint verification chip, configured to verify a collected fingerprint.

RF circuit 80 may be configured to receive and send a radio signal in an information receiving and sending process or a call process. Specifically, RF circuit 80 may receive downlink data from a base station, and then send the downlink data to processor 150 for processing. In addition, RF circuit 80 may further send uplink-related data to the base station. Generally, RF circuit 80 includes but is not limited to an antenna, at least one amplifier, a transceiver, a coupler, a low noise amplifier, a duplexer, and the like. In addition, RF circuit 80 may further communicate with another device through wireless communication. The wireless communication may use any communications standard or protocol, including but not limited to a global system for mobile communications, a general packet radio service, code division multiple access, wideband code division multiple access, long term evolution, an SMS message service, and the like.

Memory 15 is configured to store one or more applications and data. Processor 150 runs the one or more applications and the data that are stored in memory 15, to perform the various functions of computing device 200 and data processing. The one or more applications may comprise, for example, a computer game, or any other application that requires the rendering of computer graphics data for display on a display panel 40 of display unit 35. Memory 15 mainly includes a program storage area and a data storage area. The program storage area may store the operating system, an application required by at least one function, and the like. The data storage area may store data created based on use of the computing device 200. In addition, memory 15 may include a high-speed random access memory, and may further include a non-volatile memory, for example, a magnetic disk storage device, a flash memory device, or another non-volatile solid-state storage device. Memory 15 may store various operating systems such as an iOS® operating system developed by Apple Inc. and an Android® operating system developed by Google Inc. It should be noted that any of the one or more applications may alternatively be stored in a cloud, in which case computing device 200 obtains the one or more applications from the cloud.

Display unit 35 may include a display panel 40. Display panel 40 (for example, a touch panel) may collect a touch event or other user input performed thereon by the user of the computing device 200 (for example, a physical operation performed by the user on display panel 40 by using any suitable object such as a finger or a stylus), and send collected touch information to another component, for example, processor 150. Display panel 40 on which the user input or touch event is received may be implemented on a capacitive type, an infrared light sensing type, an ultrasonic wave type, or the like.

Display panel 40 may be configured to display information entered by the user or information provided for the user, and various menus of the computing device 200. For example, display panel 40 may further include two parts: a display driver chip and a display module (not shown). The display driver chip is configured to receive a signal or data sent by processor 150, to drive a corresponding screen to be displayed on the display module. After receiving the to-be-displayed related information sent by processor 150, the display driver chip processes the information, and drives, based on the processed information, the display module to turn on a corresponding pixel and turn off another corresponding pixel, to display a rendered computer model, for example.

For example, in this embodiment of this application, the display module may be configured by using an organic light-emitting diode (organic light-emitting diode, OLED). For example, an active matrix organic light emitting diode (active matrix organic light emitting diode, AMOLED) is used to configure the display module. In this case, the display driver chip receives related information that is to be displayed after the screen is turned off and that is sent by the processor 150, processes the to-be-displayed related information, and drives some OLED lights to be turned on and the remaining OLEDs to be turned off, to display a rendered computer model.

Wireless connection module 75 is configured to provide computing device 200 with network access that complies with a related wireless connection standard protocol. Computing device 200 may access a wireless connection access point by using the wireless connection module 75, to help the user receive and send an e-mail, browse a web page, access streaming media, and the like. Wireless connection module 75 provides wireless broadband internet access for the user. In some other embodiments, wireless connection module 75 may alternatively serve as the wireless connection wireless access point, and may provide wireless connection network access for another electronic device.

Audio frequency circuit 70 may be connected to a loudspeaker and a microphone (not shown) and may provide an audio interface between the user and computing device 200. Audio frequency circuit 70 may transmit an electrical signal converted from received audio data to the loudspeaker, and loudspeaker the may convert the electrical signal into a sound signal for outputting. In addition, the microphone may convert a collected sound signal into an electrical signal, and audio frequency circuit 70 may convert the electrical signal into audio data after receiving the electrical signal, and may then output the audio data to radio frequency circuit 80 to send the audio data to, for example, a mobile phone, or may output the audio data to memory 15 for further processing.

Input unit 30 is configured to provide various interfaces for an external input/output device (for example, a physical keyboard, a physical mouse, a display externally connected to computing device 200, an external memory, or a subscriber identity module card). For example, a mouse is connected by using a universal serial bus interface, and a subscriber identity module (subscriber identity module, SIM) card provided by a telecommunications operator is connected by using a metal contact in a subscriber identity module card slot. Input unit 30 may be configured to couple the external input/output peripheral device to processor 150 and memory 15.

Computing device 200 may further include power supply module 10 (for example, a battery and a power supply management chip) that supplies power to the components. The battery may be logically connected to processor 150 by using the power supply management chip, so that functions such as charging management, discharging management, and power consumption management are implemented.

Computer device 200 further includes a GPU 60. GPU 60 includes a vertex shader 45, a rasterizer 50, and a fragment shader 55. Generally, GPU 60 is a specialized electronic circuit configured to rapidly manipulate and alter memory to accelerate the creation of images in a frame buffer intended for output to display unit 35. Vertex shader 45 is a three-dimensional shader that, as described in further detail below, is executed once for each vertex of a computer model that is input to GPU 60. A purpose of vertex shader 45 is to transform each vertex's 3D position in virtual space to corresponding 2D coordinates at which the vertex will appear on display panel 40. Vertex shader 45 can manipulate properties of the vertices of the computer model such as position, colour, and texture coordinates. Rasterizer 50 performs rasterization whereby each individual primitive (e.g., a polygon such as a triangle) is broken down into discrete elements referred to as fragments (e.g., a pixel element), based on the coverage of the primitive (e.g., based on the projected screen space occupied by the primitive). Fragment shader 55 is configured to determine the colour and other attributes of each "fragment" of the computer model, each fragment being a unit of rendering work affecting at most a single output pixel.

The following embodiments may all be implemented on an electronic device (for example, computing device 200) with the foregoing hardware structure.

Figure 2:
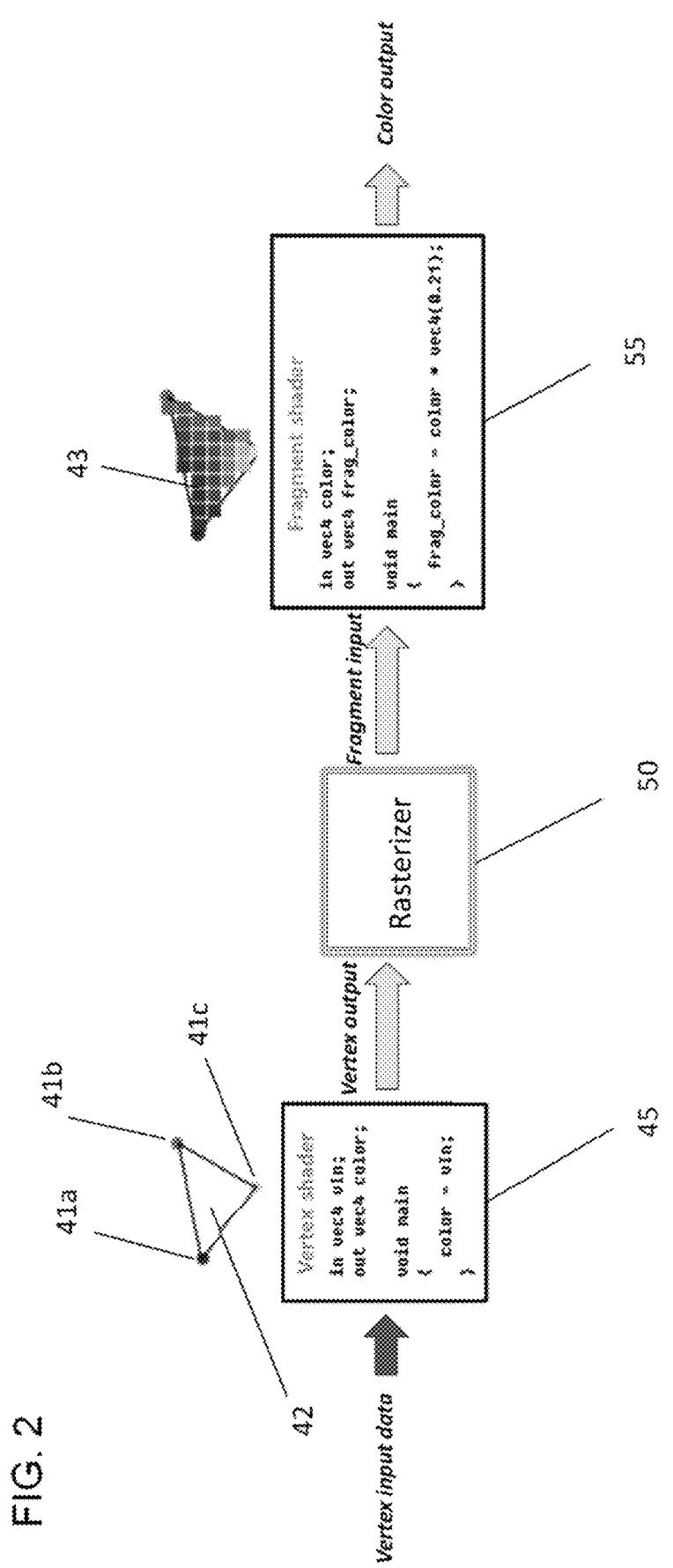
FIG. 2 is a schematic diagram of components of a graphics processing unit, according to an embodiment of the disclosure.

Turning to FIG. 2, there will now be described a rasterization pipeline that may be implemented by GPU 60. The rasterization pipeline is a hardware component in GPU 60 comprising vertex shader 45, rasterizer 50, and fragment shader 55. In particular, a computer model constructed of many polygons (such as triangles or quadrilaterals) is input to GPU 60 and processed as now described in further detail. For example, during the execution by processor 150 of a computer game application stored in memory 15, GPU 60 may be called upon by processor 150 to process computer graphics generated as a result of the execution of the computer game. The processing of the computer graphics may comprise GPU 60 rasterizing one or more computer models defined as part of the computer graphics, so that the computer models may be converted, for example, from a three-dimensional space to a two-dimensional space for suitable display on a screen, such as display panel 40.

For the sake of simplicity, rasterization of a computer model will now be described in connection with a triangle forming part of the computer model, although it shall be recognized by the skilled person that the computer model may be defined using any other suitable polygons. As can be seen in FIG. 2, a triangle 42 forming part of the computer model is being processed by GPU 60 and is provided to the rasterization pipeline shown in FIG. 2. Triangle 42 is defined by three points, known as its vertices 41a, 41b, and 41c (collectively, "vertices 41"). Each vertex is defined according to its position, for example its coordinates relative to an origin.

At the start of the rasterization pipeline, vertex input data comprising position data for vertices 41 is input to vertex shader 45 of GPU 60. Vertex shader 45 processes the vertex input data and generates vertex output data based on the vertex input data. For example, vertex shader 45 may determine a colour that is to be associated with each vertex 41 of triangle 42. The particular colour that is determined for each vertex 41 may depend, for example, on the particular function or functions defined within vertex shader. For instance, different computer models may be processed using different vertex shaders, and accordingly their vertices may be associated with different colours depending on which vertex shader is processing the computer model. In the example of FIG. 2, vertex 41a is associated with a blue colour, vertex 41b is associated with a red colour, and vertex 41c is associated with a green colour.

Subsequent to the generation of vertex output data, the vertex output data is then input to and processed by rasterizer 50. The vertex output data may comprise both position data and associated colour data for vertices 41. Rasterizer 50 processes the vertex output data and generates fragment input data based on the vertex output data. In particular, based on the positions of vertices 41, rasterizer 50 computes the positions of all pixels 43 contained within triangle 42, and interpolates a colour to be associated with each pixel 43 based on a weighted average of the position of the pixel 43 relative to the positions of vertices 41 and the colour associated with vertices 41. The fragment input data therefore comprises position data and colour data for every pixel 43 contained within triangle 42.

Various types of interpolation may be defined within rasterizer 50. For example, according to the graphics language OpenGL, three different types of interpolation are defined: "flat", "no perspective", and "smooth". Each of these three different types of interpolation is linear, meaning that the interpolated value is a weighted average of the responding vertices. The weights (i.e. the λs described below in connection with FIG. 6) are computed according to the type of interpolation used by rasterizer 50, and may involve non-trivial geometry calculations. In the example shown in FIG. 2, the interpolation technique employed by rasterizer 50 is "smooth" interpolation.

According to "flat" interpolation", the value calculated for a pixel is the value of one of the vertices. According to "no perspective" interpolation, the value calculated for a pixel is linearly interpolated in window-space. According to "smooth" interpolation, the value calculated for a pixel is interpolated in a perspective-correct fashion. Perspective-correct means that parts of the object that are closer to the observer appear larger than parts of the object that are further from the observer.

The fragment input data is then input to a fragment shader 55 which processes the fragment input data and generates fragment output data based on the fragment input data. For example, fragment shader 55 processes each pixel 43 identified within fragment input data, by performing on each pixel 43 one or more functions defined within fragment shader 55 using one or more expressions of computer code. In the example shown in FIG. 2, fragment shader 55 is configured to multiply a constant (0.21) with a value associated with the colour given to each pixel 43 by rasterizer 50. More specifically, in the example shown in FIG. 2, vertex shader 45 takes the vertex input "yin" and passes the vertex input directly to the vertex output "color". Fragment shader 55 takes the fragment input "color", which is the interpolated value of the fragment's owning vertices generated by rasterizer 50, and multiplies the fragment input with a floating point constant "vec4(0.21)". The resulting value is passed to the fragment output "frag_color".

The resulting colouration of pixels 43 within triangle 42 can be seen above fragment shader 55. Due to the linear interpolation of the colours of pixels 43 by rasterizer 50, and due to the further linear operation of multiplying, by fragment shader 55, each colour value with a constant 0.21, the appearance of the colours of pixels 43 is linear in nature. For example, the colours of pixels 43 gradually approach the colours of vertices 41 as pixels 43 are located closer to vertices 41. In general, the colour values contained in the fragment output data are close to the colours of the pixels that a user will perceive on display panel 40. While the above example has been described in the context of determining colour that is to be associated with vertices 41 and pixels 43 contained within triangle 42, according to some embodiments other characteristics of vertices 41 and pixels 43 may be generated. For example, fragment shader 55 may have many different inputs, including various attributes associated with the pixels (such as texture coordinates and other properties), all of which may be interpolated by rasterizer 50. In the context of the present disclosure, the "colour" of pixels is used as a relatively easy example in order to better describe the embodiments herein.

As can be seen from the example shown in FIG. 2, vertex shader 45 is executed three times (once for each of vertices 41s, 41b, and 41c) in order to determine the colours associated with vertices 41. However, fragment shader 55 is executed many more times (once for each pixel 43 contained within triangle 42) in order to process the colour values of pixels 43 output by rasterizer 50. Since fragment shader 55 is executed many more times than vertex shader 45, the processing requirements placed on fragment shader 55 may be alleviated by transferring one or more algebraic expressions of code ("code expressions") defined within fragment shader 55 from fragment shader 55 to vertex shader 45. In such a case, any such code expressions that are transferred from fragment shader 55 to vertex shader 45 may be executed by vertex shader 45 instead of by fragment shader 55. Furthermore, due to the fact that rasterizer 50's interpolation of the colours associated with pixels 43 within triangle 42 is linear in nature, the linearity of any linear code expression that is transferred ("hoisted") from fragment shader 55 to vertex shader 45 is preserved. As a result, linear code expressions may be "safely" transferred from fragment shader 55 to vertex shader 45 without affecting the fragment output data that is ultimately generated by fragment shader 55. An example of this process is now described and shown in FIGS. 3 and 4.

Figure 3:
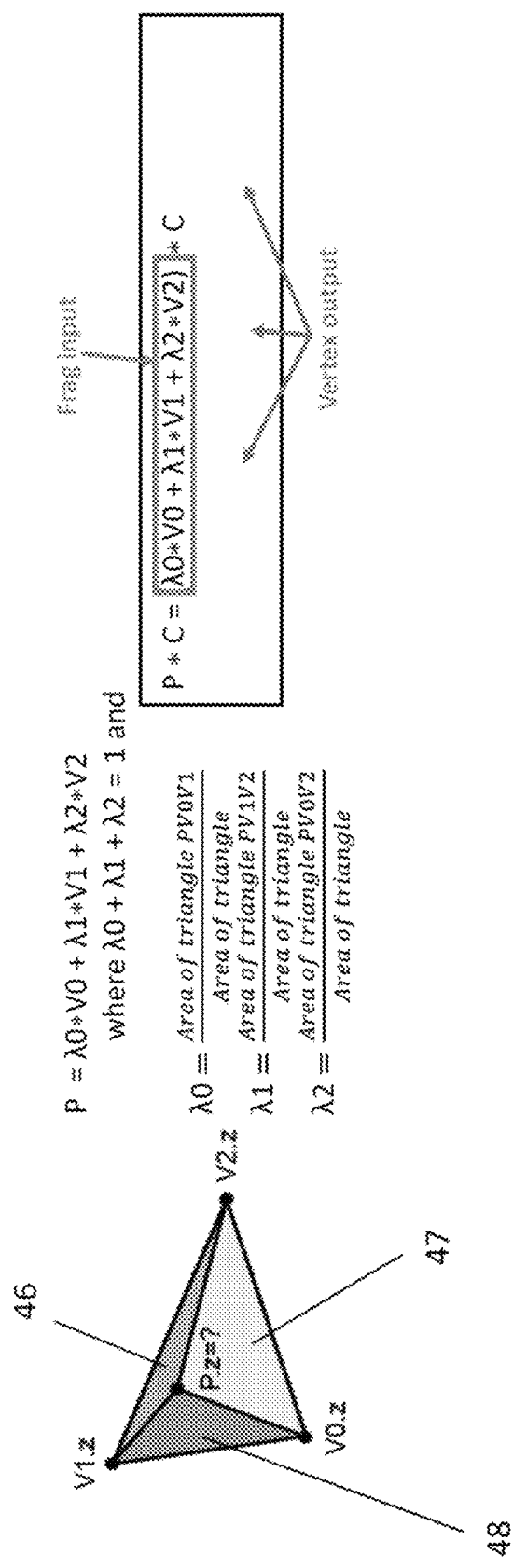
FIG. 3 is a schematic diagram of a polygon undergoing rasterization, according to an embodiment of the disclosure.

FIG. 3 shows a genericized example of the rasterization process described in FIG. 2. In FIG. 3, the colour of a pixel P is determined by rasterizer 50 according to a weighted linear interpolation based on the position of pixel P relative to the positions of vertices V0, V1, and V2, as well as the respective colours associated with vertices V0, V1, and V2. In particular, $P=\lambda0*V0+\lambda1*V1+\lambda2*V2$, wherein $\lambda n$ (n=0, 1, 2) are scaling factors, wherein $\lambda0+\lambda1+\lambda2=1$, and wherein:

$\lambda0$ is equal to the area of the triangle defined by P, V0, and V1, divided by the area of the triangle defined by vertices V0, V1, and V2;

$\lambda1$ is equal to the area of the triangle defined by P, V1, and V2, divided by the area of the triangle defined by vertices V0, V1, and V2; and $\lambda2$ is equal to the area of the triangle defined by P, V0, and V2, divided by the area of the triangle defined by vertices V0, V1, and V2.

After rasterization by rasterizer 50, pixel P is processed by fragment shader 55. Assuming that fragment shader 55 scales the value of the colour of pixel P by a constant C, the output of fragment shader 55 is:

$$P*C=(\lambda0*V0+\lambda1*V1+\lambda2*V2)*C=\lambda0*V0*C+\lambda1*V1*C+\lambda2*V2*C.$$

As can be seen at the right-hand side of FIG. 3, the expression $\lambda0*V0+\lambda1*V1+\lambda2*V2$ represents the output of rasterizer 50 which is input to fragment shader 55. This expression is shown to be equal to $\lambda0*V0*C+\lambda1*V1*C+\lambda2*V2*C$, wherein $\lambda n*Vn*C$ (n=0, 1, 2) is the output of vertex shader 45. Thus, it can be seen that a linear operation performed by fragment shader 55 (multiplication of the colour output of rasterizer 50 by a constant C) may instead be performed by vertex shader 45 without affecting the output of fragment shader 55. In other words, instead of calculating Vn, vertex shader 45 may be configured to calculate Vn*C before interpolation by rasterizer 50. In such a case, there would be no need for fragment shader 55 to process each pixel 43 by multiplying the colour value of each pixel 43 by C.

Figure 4:
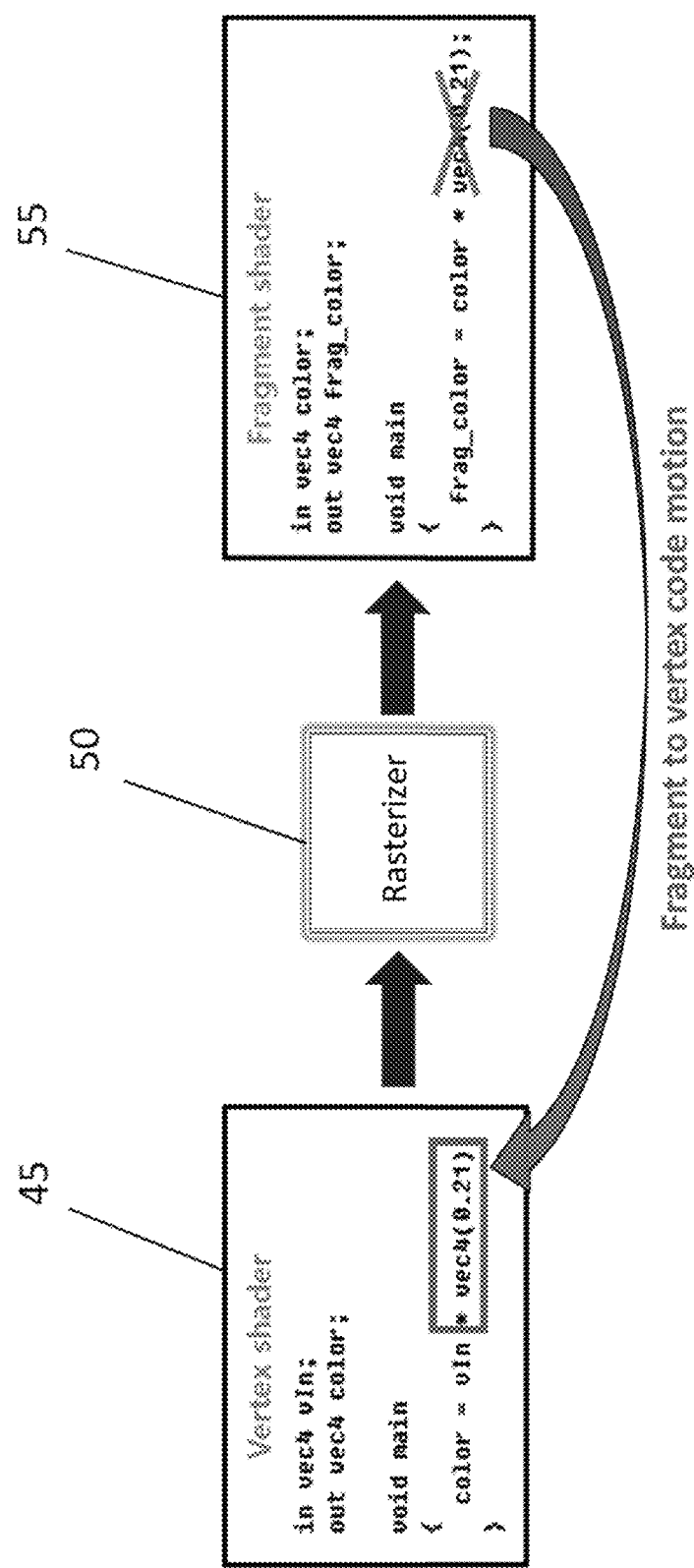
FIG. 4 is a schematic diagram of components of a graphics processing unit, illustrating the hoisting of a portion of code from a fragment shader to a vertex shader, according to an embodiment of the disclosure.

FIG. 4 shows an example of transferring, otherwise known as hoisting, the code expression corresponding to the multiplication of the fragment input data by the constant C from fragment shader 55 to vertex shader 45. In particular, it can be seen that the linear code expression vec4(0.21) in fragment shader 55 (i.e. multiplication of the pixel colours output by rasterizer 50 by the constant C=0.21) has been transferred by GPU 60 from fragment shader 55 to vertex shader 45. More specifically, in the example shown in FIG. 4, the fragment input "color", which is the interpolated value of the fragment's owning vertices generated by rasterizer 50, is multiplied by a floating point constant "vec4(0.21)". This multiplication by a constant is a linear computation with respect to the fragment input "color". Therefore, the multiplication can be moved from fragment shader 55 to vertex shader 45. In vertex shader 45, the multiplication is performed on the vertex output "color".

Figure 5:
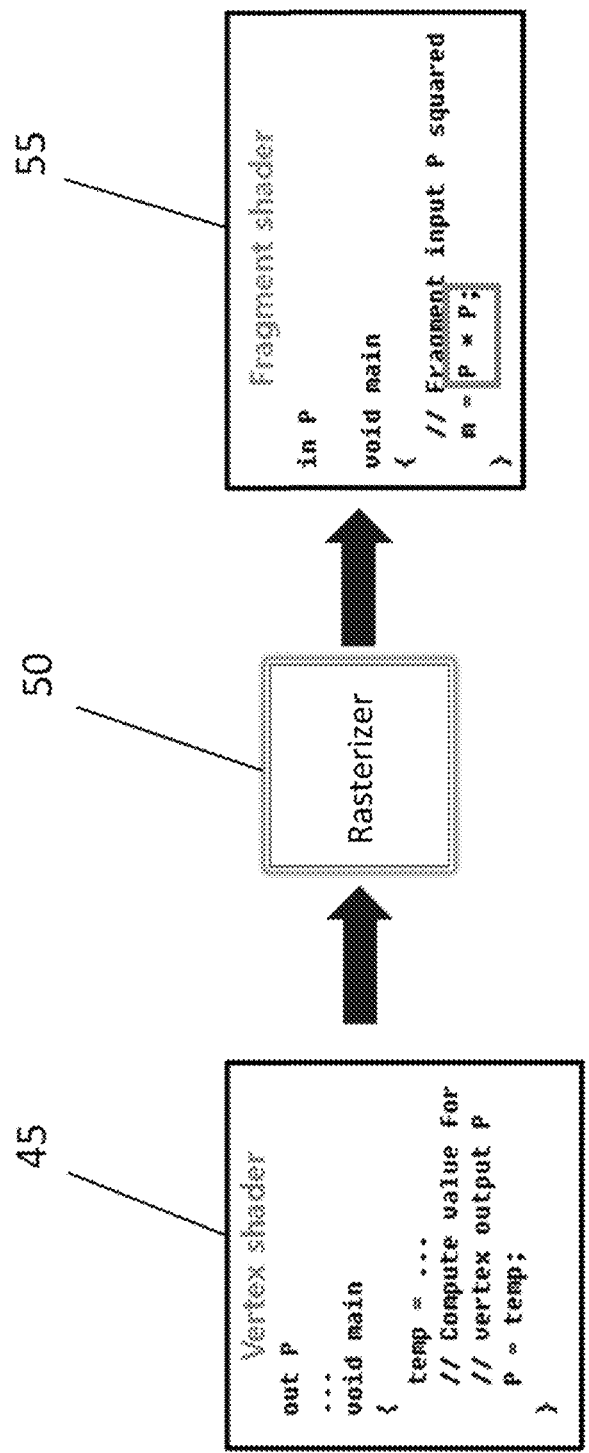
FIG. 5 is a schematic diagram of components of a graphics processing unit, illustrating the processing of a non-linear expression of code in the fragment shader, according to an embodiment of the disclosure.
Figure 6:
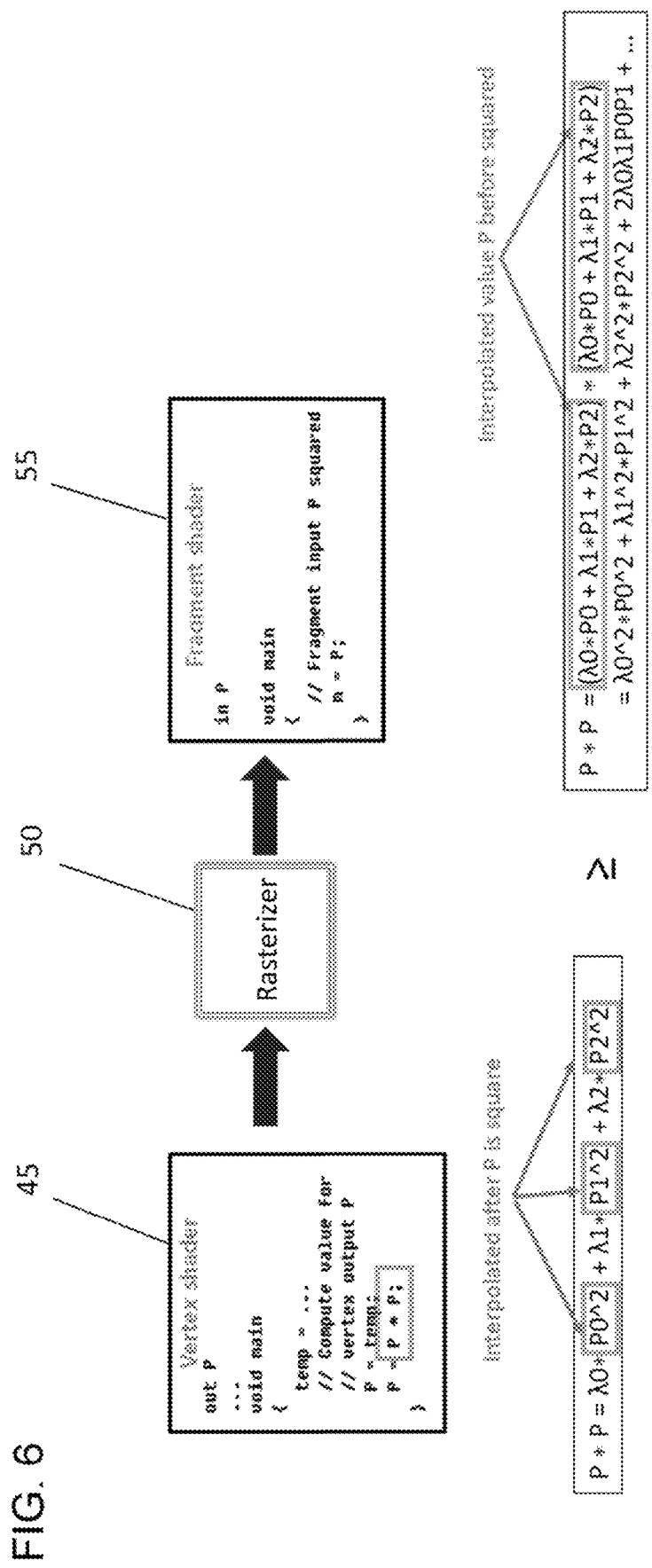
FIG. 6 is a schematic diagram of components of a graphics processing unit, illustrating an error induced when a non-linear expression of code is hoisted from the fragment shader to the vertex shader, according to an embodiment of the disclosure.

While the linearity of a linear code expression is preserved following the transfer of the code expression from fragment shader 55 to vertex shader 45, this is not the case for a non-linear code expression, as will now be in shown in FIGS. 5 and 6. In particular, calculating non-linear code expressions by vertex shader 45 to generate the vertex output data before interpolation of the vertex output data by rasterizer 50 may produce different results than if the non-linear code expressions are calculated by fragment shader 55 after interpolation of the vertex output data by rasterizer 50.

For example, turning to FIGS. 5 and 6, there is shown a rasterization pipeline with the non-linear code expression P*P defined in fragment shader 55. If this code expression is hoisted from fragment shader 55 to vertex shader 45, then interpolation of the vertex output data after calculation of the expression P*P may lead to values that are not equal to values that would otherwise be determined if P*P were computed after interpolation of the vertex output data by rasterizer 50. More specifically, in the example shown in FIG. 5, in fragment shader 55, the fragment input "P", which is the interpolated value of the fragment's owning vertices generated by rasterizer 50, is squared. This multiplication of a variable by itself is not a linear computation with respect to the fragment input "P". Therefore, the computation should not be moved from fragment shader 55 to vertex shader 45.

In particular, if the code expression P*P is hoisted from fragment shader 55 to vertex shader 45, the code expression P*P becomes $\lambda 0*P0^2+\lambda 1*P1^2+\lambda 2*P2^2$ within vertex shader 45. In contrast, with the code expression P*P calculated within fragment shader 55, P*P becomes $[(\lambda 0*P0+\lambda 1*P1+\lambda 2*P2)*(\lambda 0*P0+\lambda 1*P1+\lambda 2*P2)]=\lambda 0^2*P0^2+\lambda 1^2*P1^2+\lambda 2^2*P2^2+2*\lambda 0*\lambda 1*P0*P1+$ etc. The former expression of P*P, calculated within vertex shader 45 prior to interpolation by rasterizer 50, is not equal to the latter expression of P*P, calculated within fragment shader 55 after interpolation by rasterizer 50. Therefore, the fragment output data that is generated may be different depending on whether or not non-linear code expressions are transferred from fragment shader 55 to vertex shader 45.

More specifically, in the example shown in FIG. 6, in vertex shader 45, an intermediate value "temp" is squared before it is assigned to the vertex output "P", which is then passed to rasterizer 50. The fragment input "P" then takes the value from the output of rasterizer 50, which is the interpolated value of the fragment's owning vertices generated by rasterizer 50. Therefore, the vertex output is interpolated after the square computation on "temp", as shown in the bottom-left expression. In contrast, as in the case of FIG. 5, the square computation is performed in fragment shader 55. In this case, the vertex output is interpolated before the square computation, as shown in the bottom-right expression of FIG. 6. It can be shown mathematically that for certain values of "temp" the bottom-left expression is greater than or equal to the bottom-right expression.

According to embodiments of the disclosure, there will now be described methods of transferring code expressions from fragment shader 55 to vertex shader 45. Such methods may advantageously relieve the processing requirements placed on fragment shader 55, while also taking advantage of the fact that the linearity of code expressions is generally preserved when transferring linear code expressions from fragment shader 55 to vertex shader 45.

According to embodiments of the disclosure, GPU 60 is configured to hoist one or more non-linear code expressions from fragment shader 55 to vertex shader 45 by first approximating each non-linear code expression to a linear code expression, and subsequently transferring the approximated linear code expression from fragment shader 55 to vertex shader 45. Although the fragment output data generated following the transfer of the approximated linear code expression may not be identical to the fragment output data that would otherwise have been generated if the non-linear code expression were calculated in fragment shader 55, the discrepancies that result may be acceptable to a user of computing device 200. For example, the benefits in increased processing efficiency that result from transferring one or more computationally expensive non-linear expressions of code from fragment shader 55 to vertex shader 45 may outweigh the discrepancies in the accuracy of the computer model rasterization. Users, such as computer gamers, are generally more sensitive to latency (which may result from the processing of complex rendering code, including the processing of numerous linear and non-linear expressions) when playing a computer game than they may be to the particular shades of colour that are generated during computer gameplay.

Figure 7:
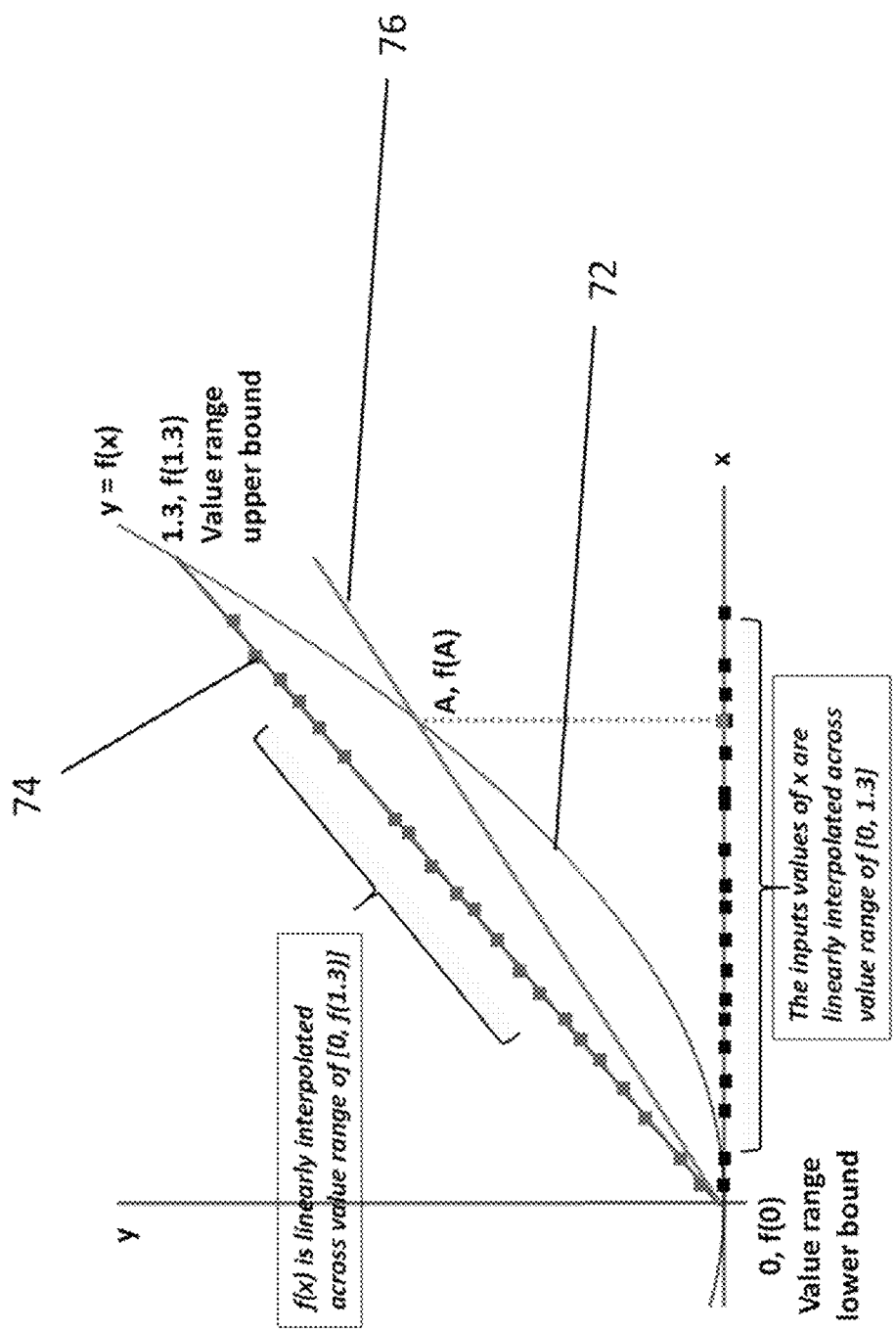
FIG. 7 is a plot of straight lines, based on a non-biased range of input values, approximating a curve associated with a non-linear expression of code, according to an embodiment of the disclosure.

Generally, a linear expression may refer to an expression that is a linear function with respect to a variable, for example such as: $y=(c1*x)+c2$ (where c1 and c2 are constants); and $y1+y2$ or $y1-2$ (where y1 and y2 are constants). In contrast, a non-linear expression may generally refer to an expression that is a non-linear function with respect to a variable, such as polynomial or logarithmic expressions, for example such as: $y=x*x$; $y=1/x$; and $y=x*x+1/x$]. (Non-linear expressions may be identified by their mathematical structure and by the kinds of expressions (such as logarithmic) that they include; further, some non-linear expressions may include linear expressions, but generally the linear part can be mathematically severed from the non-linear part, with the non-linear part being treated as a non-linear expression in its own right.) There are various ways in which a non-linear code expression may be approximated to a linear code expression. Approximating a non-linear expression to a linear expression may be termed transforming the non-linear expression of code into the linear expression of code. A first such method is shown in FIG. 7. In FIG. 7, the black curve 72 represents a non-linear code expression f(x). f(x) is monotonic within a range of input values (in this case, [0, 1.3]), the input values corresponding to the fragment input data that is input to fragment shader 55. The red line 74 represents the approximate linear expression of f(x) in the event that the non-linear expression of f(x) were transferred as-is from fragment 55 to vertex shader 45. As can be seen, for many values of x, a relatively large error exists between red line 74 and black curve 72. An improved linear approximation of f(x) may therefore be determined by applying a scaling factor to the linear expression for red line 74, wherein the scaling factor is determined based on an average value of the input values within the whole range of input values. In the case of the example shown in FIG. 7, the scaling factor is A. The green line 76 in FIG. 7 represents the result of applying the scaling factor A to red line 74. The linear expression representing green line 76 is therefore used to determine the linear code expression corresponding to the non-linear code expression associated with black curve 72. In the case of FIG. 7, A represents the mode average of the input values, although other types of averages may be used such as the mean average or the median average.

This first method of approximating a non-linear code expression to a linear code expression may be suitable if, for example, the input values are generally evenly distributed within the range of input values. For example, this first method of approximating a non-linear code expression to a linear code expression may be suitable if the input values are generally not biased towards any one or more particular input values.

Furthermore, while the specific example shown in FIG. 7 relates to the scaling of a first linear approximation by a scaling factor, a non-linear code expression may more generally be approximated to a linear code expression by minimizing the error between any given straight line and a curve represented by the non-linear code expression.

Figure 8:
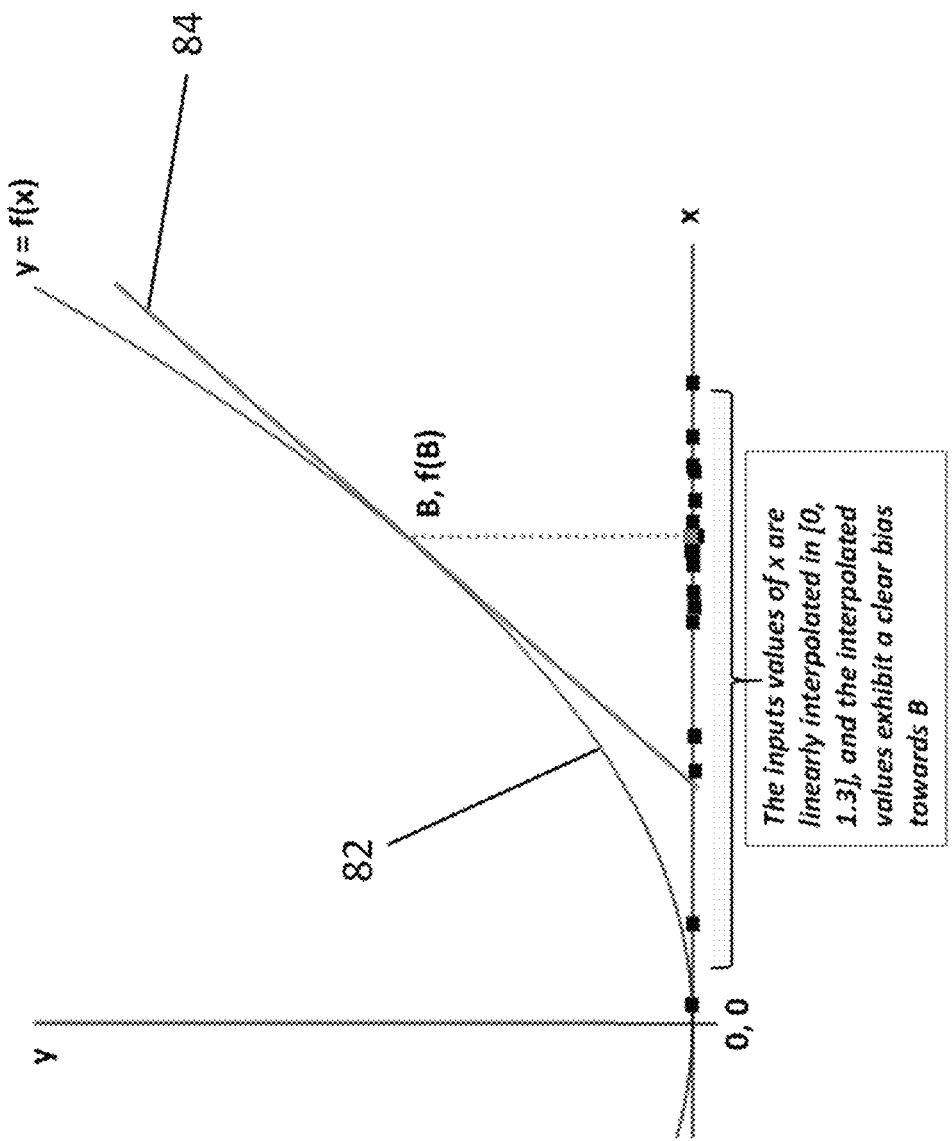
FIG. 8 is a plot of a tangent line, based on a biased range of input values, approximating a curve associated with a non-linear expression of code, according to an embodiment of the disclosure.

Turning to FIG. 8, there is now shown an alternative method of approximating a non-linear code expression to a linear code expression. In contrast to the first method described above in connection with FIG. 7, this second method of approximating a non-linear code expression to a linear code expression may be suitable if, for example, the input values are generally not evenly distributed within the range of input values. For example, this second method of approximating a non-linear code expression to a linear code expression may be suitable if the input values are generally biased towards one or more particular input values (or "bias points") within the input value range. Input values may be biased if, for example, the input values are concentrated around one or more bias points as opposed to being relatively evenly distributed throughout the input value range. Various heuristic methods of determining whether a data set includes one or more bias points may be used in connection with the embodiments described herein.

In FIG. 8, the black curve 82 represents a non-linear code expression f(x). The input values of x (interpolated by rasterizer 50) are this time seen to exhibit a clear bias towards a bias point B within the range of input values (in this case, [0, 1.3]). f(B) is the value of the black curve at bias point B and, according to the second method of linear approximation, the linear approximation of the non-linear code expression is based on the tangent to the black curve at f(B), as represented by the green line 84.

Bias points may be scene-specific and may be determined either "online" (e.g. on-the-fly, when the computer game is being played by a user) or during a profiling or calibration phase. A profiling phase may refer to a period of time during which the computer game is played but during which latency is not considered a limiting factor, such as during development or performance tuning of the computer game prior to delivery of the computer game to customers. During the profiling phase, profiling data may be generated and stored for future use. The profiling data may include, for example, an indication of one or more bias points associated with input values within specific ranges of input values. Profiling data may be updated from time to time, in order to provide more accurate rendering of the computer model. For example, game developers may collect feedback data from gamers and may use such feedback data as guide for further tuning. When a new patch is released for the game, the new patch may include new profiling data for use by the GPU.

Figure 9:
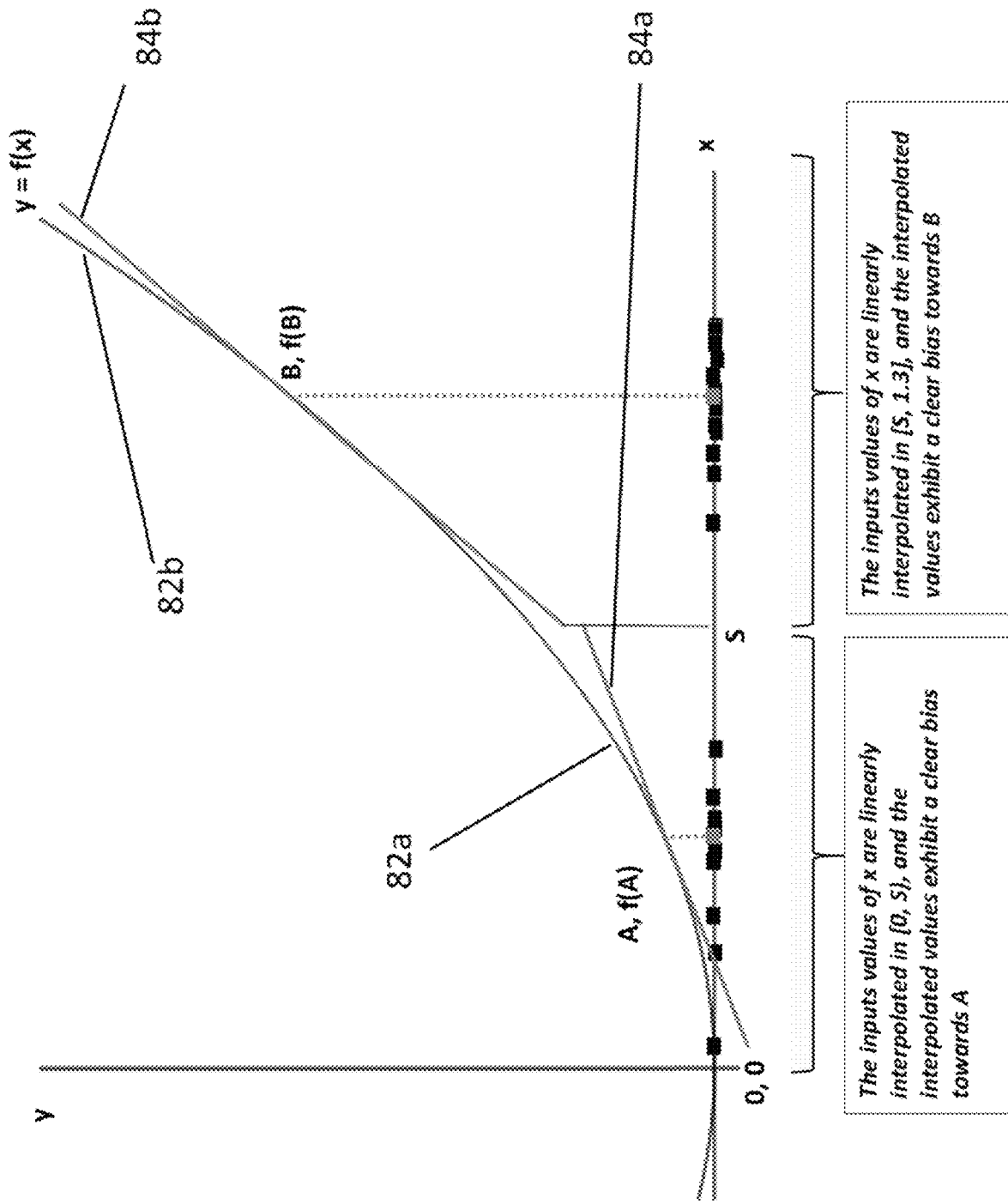
FIG. 9 is a plot of multiple tangents line, based on biased ranges of input values, approximating a curve associated with a non-linear expression of code, according to an embodiment of the disclosure.

Turning to FIG. 9, there is now shown a third method of approximating a non-linear code expression to a linear code expression. According to this method, piecewise linear approximation of a curve may be used to generate multiple linear code expressions that approximate a non-linear code expression. For example, a curve representing the non-linear code expression is first divided into multiple monotonic curve portions, and each curve portion is then approximated to a respective straight line. For example, as seen in FIG. 9, the black curve is divided into a first curve portion 82a defined within the range [0, S] and a second curve portion 82b defined within the range [S, 1.3]. Using the tangent approximation method described above, curve portion 82a is approximated to tangent line 84a and curve portion 82b is approximated to tangent line 84b. Tangent lines 84a and 84b are then used to define multiple linear code expressions into which the non-linear code expression is transformed. The multiple linear code expressions are then hoisted to vertex shader 45.

It shall be recognized that the disclosure extends to other methods of approximating non-linear code expressions to linear code expressions. For example, any method of approximating a linear expression to a curve may be used. For example, any method that seeks to reduce the average error between a curve and a straight line may be used. In this context, average may refer to a mean value, a median value, a mode value, a weighted average, or any other value that is representative of a wider group of values.

Figure 10:
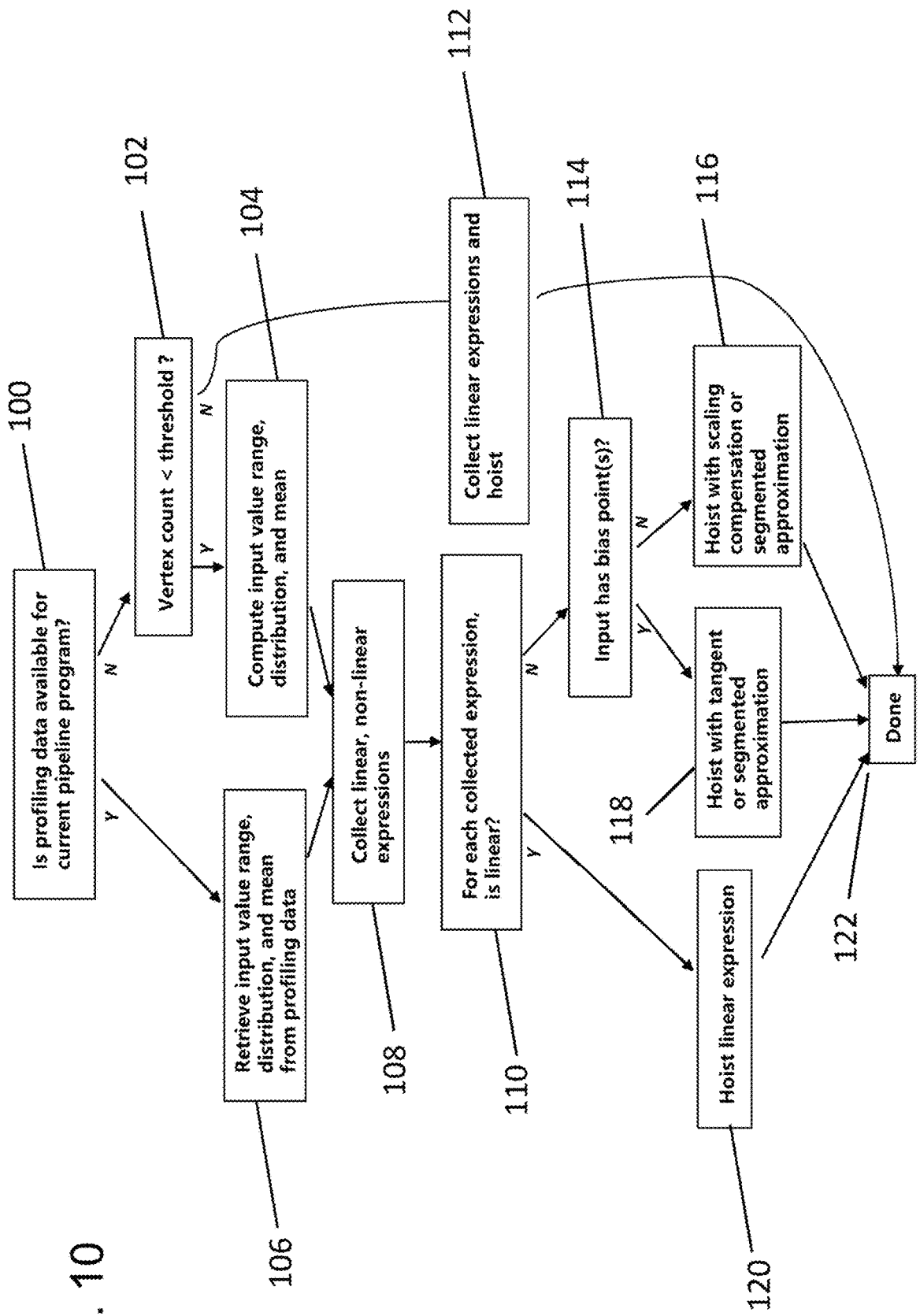
FIG. 10 is a flow diagram of a method of rasterizing a computer model, according to an embodiment of the disclosure.

Now turning to FIG. 10, there is shown a flow diagram of example methods of computer model rasterization, according to embodiments of the disclosure. The method may be performed, for example, by computer device 200.

Starting at block 100, GPU 60 determines whether profiling data is available for the current rasterization pipeline. The current rasterization pipeline may comprise a current set of shader programs (e.g., vertex shaders and fragment shaders) running on GPU 60. For example, as discussed above, profiling data may be data that is generated by performing rasterization on the computer model prior to the application featuring the computer model being deployed "online" (e.g. being used by customers). For example, in the case of a computer game, the computer game may be played by one or more users during a profiling phase before the game is shipped to customers. During the profiling phase, profiling data may be generated by GPU 60. Profiling data generally refers to raw data that can be interpreted to show performance-related characteristics of a running program. In one example, profiling data may include a counter of how many times a particular loop is executed (this generally cannot be determined unless the loop actually run). A compiler can then use the profiling data to direct optimization of shader source code. For example, the compiler may unroll the loop if the profile data indicates that the loop count is low. Furthermore, according to embodiments of the disclosure, the compiler may use the bias points determined within the profiling data in order to perform hoisting as described herein.

If profiling data is determined to be available, then, at block 106, GPU 60 extracts from the profiling data an input value range, a distribution of input values within the input value range, and an average of the input values within the input value range. The input values refer to the input(s) to fragment shader 55. For instance, in the example shown in FIG. 5, for the expression m=P*P, the input to fragment shader 55 is all values of P, one for each of the pixels.

If, on the other hand, profiling data is determined to not be available, then, at block 102, GPU 60 determines whether the number of vertices contained in the computer model is less than a threshold. For example, GPU 60 may determine the total number of vertices of all polygons defining the computer model, and compare the total number of vertices to a preset threshold. If the number of vertices contained in the computer model is determined to be less than the threshold, then the process moves to block 108. On the other hand, if the number of vertices contained in the computer model is determined to be greater than or equal to the threshold, then the process moves to block 112.

If the vertex count is determined to be too high (i.e. above the threshold), then determining an input value range, a distribution of input values within the input value range, and an average of the input values within the input value range can be prohibitively expensive in terms of computer resources if performed "online" (e.g. when the program is being used in real time by a customer). In such cases, profiling data generated offline (e.g. when the program is not being used in real time by a customer) may be used to determine the input value range, the distribution of input values within the input value range, and the average of the input values within the input value range. If, on the other hand, the vertex count is determined to not be too high (i.e. not above the threshold), then determining the input value range, the distribution of input values within the input value range, and the average of the input values within the input value range may be acceptable if performed "online".

At block 112, GPU 60 identifies within fragment shader 55 all linear code expressions, and transfers the linear code expressions from fragment shader 55 to vertex shader 45. The process then moves to block 122.

At block 108, GPU 60 collects all linear and non-linear expressions of code within fragment shader 55. For example, a compiler may scan code contained within fragment shader 55 and identify therein linear and non-linear code expressions that may be suitable for hoisting.

At block 110, for each collected code expression, GPU 60 determines whether the code expression is linear or non-linear. Generally opportunities for transferring non-linear code expressions relative to linear code expressions may present themselves at a rate of about 2:1. If the code expression is determined to be linear, then, at block 120, GPU 60 transfers the linear code expression from fragment shader 55 to vertex shader 45. If the code expression is determined to be non-linear, then, at block 114, based on the distribution of the input values within the input value range obtained at block 106, GPU 60 determines whether the input values are biased. As described above, input values may be biased if, for example, the input values are concentrated around one or more bias points as opposed to being relatively evenly distributed throughout the input value range.

If the input values are determined to be biased, then, at block 118, GPU 60 approximates the non-linear code expression to a linear code expression using the tangent approximation method (the second method) described above in connection with FIG. 8, or using the segmented approximation method (the third method) described above in connection with FIG. 9. GPU 60 then converts the non-linear code expression to the approximated linear code expression, and transfers the approximated linear code expression from fragment shader 55 to vertex shader 45. On the other hand, if the input values are not biased (e.g. if the input values are generally evenly distributed throughout the input value range), then, at block 116, GPU 60 approximates the non-linear code expression to a linear code expression using the scaling approximation method (the first method) described above in connection with FIG. 7, or the segmented approximation method (the third method) described above in connection with FIG. 9. GPU 60 then converts the non-linear code expression to the approximated linear code expression, and transfers the approximated linear code expression from fragment shader 55 to vertex shader 45.

At block 122, the hoisting of one or more non-linear code expressions (converted or transformed to approximated linear code expressions) from fragment shader 55 to vertex shader 45 is determined by GPU 60 to be complete. Furthermore, the hoisting from fragment shader 55 to vertex shader 45 of one or more linear code expressions originally contained within fragment shader 55 is also determined by GPU 60 to be complete. Rasterization of the computer model may then proceed as per normal, i.e. by inputting vertex input data of the computer model to vertex shader 45, as described above in connection with FIG. 2.

Figure 11A:
FIG. 11A shows a display of a computer model rendered using a traditional rasterization process.
Figure 11B:
FIG. 11B shows a display of the computer model of FIG. 11A, rendered using a rasterization process according to an embodiment of the disclosure.

Turning to FIGS. 11A and 11B, there are shown examples of the results of the rasterization process described herein. In FIG. 11A, there is shown, on a computer display, an image output corresponding to a rendered computer graphics scene. The computer graphics scene includes a first rendered computer model 115a (a character) and a second rendered computer model 110a (terrain). In FIG. 11A, computer models 115a and 110a have been rendered using a traditional rasterization pipeline, i.e. without the transfer of linear or non-linear code expressions from the fragment shader to the vertex shade.

On the other hand, in FIG. 11B, computer models 115b and 110b have been rendered using rasterization as described herein, i.e. with one or more non-linear code expressions having been approximated to linear code expressions and then transferred from the fragment shader to the vertex shader. As can be seen in FIG. 11B, the terrain (corresponding to the computer model 110b) through which the character (corresponding to computer model 115b) is moving is relatively darker in shade than the terrain shown in FIG. 11A. This discrepancy is due to the approximation of the one or more non-linear code expressions to linear code expressions that have then been transferred from the fragment shader to the vertex shader. However, as a result of the particular rasterization process that was used, a decrease of about 4%-5% in rendering latency was observed. It is estimated that, with further iterations of the rasterization methods described herein, a decrease of about 7%-8% in latency may be observable. From the point of the view of the user of the computer game, the decrease in rendering latency is more valued than the discrepancy in the shading of the terrain. The ability to perform good linear approximations of non-linear expressions may be especially applicable to computer graphics rendering in which accurate results are typically not a hard requirement, whereas approximate results are often acceptable provided that the rendered image quality is generally maintained. Although the methods described herein need not include rendering an image, this disclosure uses and illustrates a combined order of one or more specific rules that renders information into a specific state or format, and it is the state or format that may then be used and applied to create desired results, such as a pleasing image.

While the disclosure has been described in connection with specific embodiments, it is to be understood that the disclosure is not limited to these embodiments, and that alterations, modifications, and variations of these embodiments may be carried out by the skilled person without departing from the scope of the disclosure. It is furthermore contemplated that any part of any aspect or embodiment discussed in this specification can be implemented or combined with any part of any other aspect or embodiment discussed in this specification.

The invention claimed is:

1. A method of rasterizing a computer model, comprising:
identifying in a fragment shader one or more non-linear expressions of code;
approximating the one or more non-linear expressions of code to one or more linear expressions of code, including:
determining a curve represented by at least one of the one or more non-linear expressions of code;
dividing the curve into multiple curve portions,
approximating the multiple curve portions to multiple straight lines, wherein each straight line approximates a respective one of the curve portions; and
determining the one or more linear expressions of code based on the multiple straight lines;
transferring the one or more linear expressions of code from the fragment shader to a vertex shader; and
rasterizing the computer model, comprising executing, on the computer model, code comprised in the vertex shader, including the transferred one or more linear expressions of code.

2. The method of claim 1, wherein rasterizing the computer model comprises:
extracting vertex input data from the computer model;
generating vertex output data by executing code comprised in the vertex shader on the vertex input data;
generating fragment input data by processing the vertex output data using a rasterizer; and
generating fragment output data by executing code comprised in the fragment shader on the fragment input data.

3. The method of claim 2, wherein generating the fragment input data comprises linearly interpolating the fragment input data based on the vertex output data.

4. The method of claim 2, wherein the vertex input data comprises position data associated with vertices of one or more polygons of the computer model.

5. The method of claim 1, wherein approximating the multiple curve portions to the multiple straight lines comprises:
- determining an average difference between at least one of the straight lines and at least one of the curve portions; and
- adjusting the at least one straight line so as to minimize the difference between the at least one straight line and the at least one curve portion; and
- determining the one or more linear expressions of code based on the adjusted at least one straight line.

6. The method of claim 1, wherein approximating the multiple curve portions to the multiple straight lines comprises:
- determining an average value of fragment input data that is processed by the fragment shader;
- determining at least one of the multiple straight lines based on a value of at least one of the curve portions at the average value of the fragment input data and based on an inflection point of the at least one curve portion; and
- determining the one or more linear expressions of code based on the determined at least one straight line.

7. The method of claim 6, further comprising, prior to determining the average value of the fragment input data:
- determining a distribution of the fragment input data; and
- determining, based on the distribution of the fragment input data, that the fragment input data does not comprise any bias points.

8. The method of claim 1, further comprising:
- identifying in the fragment shader one or more linear expressions of code not comprised in the one or more transformed linear expressions of code; and
- transferring, from the fragment shader to the vertex shader, the one or more linear expressions of code not comprised in the one or more transformed linear expressions of code.

9. A non-transitory computer-readable medium comprising computer program code stored thereon and configured, when executed by one or more processors, to cause the one or more processors to perform a method of rasterizing a computer model, comprising:
- identifying in a fragment shader one or more non-linear expressions of code;
- approximating the one or more non-linear expressions of code to one or more linear expressions of code, including:
  - determining a curve represented by at least one of the one or more non-linear expressions of code;
  - dividing the curve into multiple curve portions;
  - approximating the multiple curve portions to multiple straight lines, wherein each straight line approximates a respective one of the curve portions; and
  - determining the one or more linear expressions of code based on the multiple straight lines;
- transferring the one or more linear expressions of code from the fragment shader to a vertex shader; and
- rasterizing the computer model, comprising executing, on the computer model, code comprised in the vertex shader, including the transferred one or more linear expressions of code.

10. A computing device comprising one or more graphics processors operable to perform rasterization of a computer model, wherein the rasterization comprises:
- identifying in a fragment shader one or more non-linear expressions of code;
- approximating the one or more non-linear expressions of code to one or more linear expressions of code, including:
  - determining a curve represented by at least one of the one or more non-linear expressions of code;
  - dividing the curve into multiple curve portions;
  - approximating the multiple curve portions to multiple straight lines, wherein each straight line approximates a respective one of the curve portions; and
  - determining the one or more linear expressions of code based on the multiple straight lines;
- transferring the one or more linear expressions of code from the fragment shader to a vertex shader; and
- rasterizing the computer model, comprising executing, on the computer model, code comprised in the vertex shader, including the transferred one or more linear expressions of code.

11. A method of rasterizing a computer model, comprising:
- identifying in a fragment shader one or more non-linear expressions of code;
- approximating the one or more non-linear expressions of code to one or more linear expressions of code, including:
  - determining a curve represented by at least one of the one or more non-linear expressions of code;
  - determining a bias point within fragment input data that is processed by the fragment shader;
  - determining, based on the bias point, a tangent to the curve; and
  - determining, based on the tangent, the one or more linear expressions of code;
- transferring the one or more linear expressions of code from the fragment shader to a vertex shader; and
- rasterizing the computer model, comprising executing, on the computer model, code comprised in the vertex shader, including the transferred one or more linear expressions of code.

12. The method of claim 11, wherein determining the tangent comprises determining the tangent to the curve at the bias point.

13. The method of claim 11, wherein determining the one or more linear expressions of code comprises:
- determining a linear expression of the tangent; and
- determining the one or more linear expressions of code based on the linear expression of the tangent.

14. The method of claim 11, wherein determining the bias point comprises determining the bias point based on one or more values towards which the fragment input data tends.

15. The method of claim 11, wherein determining the bias point comprises:
- determining whether profiling data is available;
- after determining whether the profiling data is available, determining a distribution of the fragment input data; and
- determining the bias point based on the distribution of the fragment input data.

16. The method of claim 15, wherein determining the distribution of the fragment input data comprises determining the distribution of the fragment input data based on the profiling data.

17. The method of claim 15, wherein determining the distribution of the fragment input data comprises:
- determining whether a vertex count of one or more polygons of the computer model is less than a threshold; and after determining whether the vertex count is less than the threshold, determining the bias point based on the distribution of the fragment input data.

18. The method of claim 11, wherein rasterizing the computer model comprises:
   extracting vertex input data from the computer model;
   generating vertex output data by executing code comprised in the vertex shader on the vertex input data;
   generating fragment input data by processing the vertex output data using a rasterizer; and
   generating fragment output data by executing code comprised in the fragment shader on the fragment input data.

19. The method of claim 18, wherein generating the fragment input data comprises linearly interpolating the fragment input data based on the vertex output data.

20. The method of claim 18, wherein the vertex input data comprises position data associated with vertices of one or more polygons of the computer model.

21. The method of claim 11, further comprising:
   identifying in the fragment shader one or more linear expressions of code not comprised in the one or more transformed linear expressions of code; and
   transferring, from the fragment shader to the vertex shader, the one or more linear expressions of code not comprised in the one or more transformed linear expressions of code.

22. A computing device comprising one or more graphics processors operable to perform rasterization of a computer model, wherein the rasterization comprises:
   identifying in a fragment shader one or more non-linear expressions of code;
   approximating the one or more non-linear expressions of code to one or more linear expressions of code, including:
      determining a curve represented by at least one of the one or more non-linear expressions of code;
      determining a bias point within fragment input data that is processed by the fragment shader;
      determining, based on the bias point, a tangent to the curve; and
      determining, based on the tangent, the one or more linear expressions of code;
   transferring the one or more linear expressions of code from the fragment shader to a vertex shader; and
   rasterizing the computer model, comprising executing, on the computer model, code comprised in the vertex shader, including the transferred one or more linear expressions of code.

* * * * *